United States Patent [19]

Happel et al.

[11] 4,196,500

[45] Apr. 8, 1980

[54] SEAT BELT BUCKLE

[75] Inventors: Hermann E. Happel; James R. Anthony, both of Indianapolis, Ind.

[73] Assignee: Indiana Mills & Manufacturing, Inc., Carmel, Ind.

[21] Appl. No.: 946,743

[22] Filed: Sep. 29, 1978

Related U.S. Application Data

[63] Continuation-in-part of Ser. No. 769,722, Feb. 17, 1977, which is a continuation-in-part of Ser. No. 685,332, May 11, 1976, abandoned.

[51] Int. Cl.$^2$ ............................................. A44B 19/00
[52] U.S. Cl. ................................................. 24/230 AL
[58] Field of Search ....................... 24/230 AL, 230 A

[56] References Cited

U.S. PATENT DOCUMENTS

| | | | |
|---|---|---|---|
| 3,522,640 | 8/1970 | Lohr | 24/230 AL |
| 3,760,467 | 9/1973 | Lohr | 24/230 AL |
| 3,807,000 | 4/1974 | Weman | 24/230 AL |
| 3,897,611 | 8/1975 | Booth | 24/230 AL |
| 4,092,767 | 6/1978 | Narayan | 24/230 AL |
| 4,128,924 | 12/1978 | Happel | 24/230 AL |

*Primary Examiner*—Nile C. Byers, Jr.
*Attorney, Agent, or Firm*—Woodard, Weikart, Emhardt & Naughton

[57] ABSTRACT

A seat belt buckle having a laminated or reinforcing plate construction. A main body has a cavity in which a spring is positioned. A latch plate located in the cavity has a pair of outwardly extending arms slidably mounted in pair of mutually opposed upright channels mounted in the cavity. The spring abuts the bottom surface of the latch plate forcing the latch plate upwardly to releasably lock in place a seat belt tongue extending through inlet means into the cavity atop the latch plae. A push button is mounted between the main body and a cover fixedly secured to the main body. The push button has outwardly extending legs slidably received in the channels and abutting the arms on the latch plate whereby the push button may be depressed to move the latch plate and spring downwardly releasing the tongue from the buckle. A plate or block is mounted in a recess on the main body with a second plate mounted thereatop. Lateral force exerted on the latch plate by the tongue is transferred to the channels and then to at least one reinforcing plate and main body.

3 Claims, 16 Drawing Figures

SEAT BELT BUCKLE

CROSS REFERENCE TO RELATED APPLICATIONS

This application is a continuation-in-part of our application Ser. No. 769,722 filed Feb. 17, 1977 which is a continuation-in-part of our application Ser. No. 685,332 filed May 11, 1976 and now abandoned.

BACKGROUND OF THE INVENTION

This invention is in the field of seat belt buckles for use in a variety of vehicles to secure occupants therein. A great number of seat buckles have been devised and patented for use in a variety of applications. For example, in the U.S. Pat. Nos. 3,760,467 and 3,807,000 there are disclosed push button seat belt buckles wherein a latch plate is slidably mounted in a pair of channels secured within the main buckle housing. A spring is provided on one side of the latch plate whereas a push button is provided on the opposite side of the latch plate to allow control of movement of the latch plate which engages and disengages a tongue inserted into the cavity of the buckle housing. The housing disclosed in the aforementioned patents may be cast in metal.

In order to produce a low-cost seat belt buckle, the buckle housing may be produced from plastic in lieu of metal. A problem with the prior plastic buckles is the failure of the plastic buckle housing when subjected to the various load tests that are required prior to installation of the buckle in a vehicle. In one embodiment disclosed herein, a pair of mtal reinforcing plates are positioned within the buckle housing to provide the necessary strength and to prevent the buckle from failing during load tests. The buckle is designed so as to transfer the lateral force exerted by the tongue through a movable latch plate and onto a pair of upright channels which in turn transfer the force onto the reinforcing plates fixedly secured to the plastic buckle housing. Thus, failure of the housing is prevented while simultaneously providing an attractive, low-cost buckle. Other patents of interest are the U.S. Pat. Nos. 3,911,236, which discloses a laminated buckle, and 3,807,000 which discloses a leaf spring for urging a latch plate into engagement with the buckle tongue. In another embodiment disclosed herein, one of the reinforcing plates is replaced with a plastic block having load transfer pins to transfer the tongue force from the upright channels to the buckle main body.

SUMMARY OF THE INVENTION

One embodiment of the present invention is a seat belt buckle including a main body member having a cavity therein, a cover member adapted to overlie the body member, a first reinforcing means positioned in the main body member and also having a cavity therein registering with the body cavity, movable latching means for engaging a seat belt tongue and manual operating means accessible at the exterior of the cover member for actuating the latching means, the improvement comprising the cover member and body member at adjacent ends form an entry passage for a seat belt tongue into the body member cavity and the cavity of the first reinforcing means, a second reinforcing means positioned between the cover member and body member, the first reinforcing means is operable to transfer load applied by the seat belt tongue on the latching means to the body member, the first reinforcing means and second reinforcing means include registering apertures accommodating the latching means and the operating means.

Another embodiment of the present invention is the combination of a tongue plate with a latch aperture, a buckle into which the tongue plate is inserted and including a main body with a forward lip and a rear stop, a block positioned on the main body between the stop and lip which limit movement thereof with the block defining with the main body a tongue plate-receiving cavity, latching means located in the cavity and projecting into the aperture being operable to releasably hold the tongue plate in the cavity, a plate member positioned between the main body and the block with the main body extending on opposite sides of the plate member and block limiting movement between the plate member, block and the main body, and locking means extending through the plate member into the block locking the plate member and block together.

It is an object of the present invention to provide a new and improved seat belt buckle.

It is a further object of the present invention to provide a seat belt buckle having at least some plastic components with means to transfer tongue force to metal components without failure of plastic components.

Related objects and advantages of the present invention will be apparent from the following description.

DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
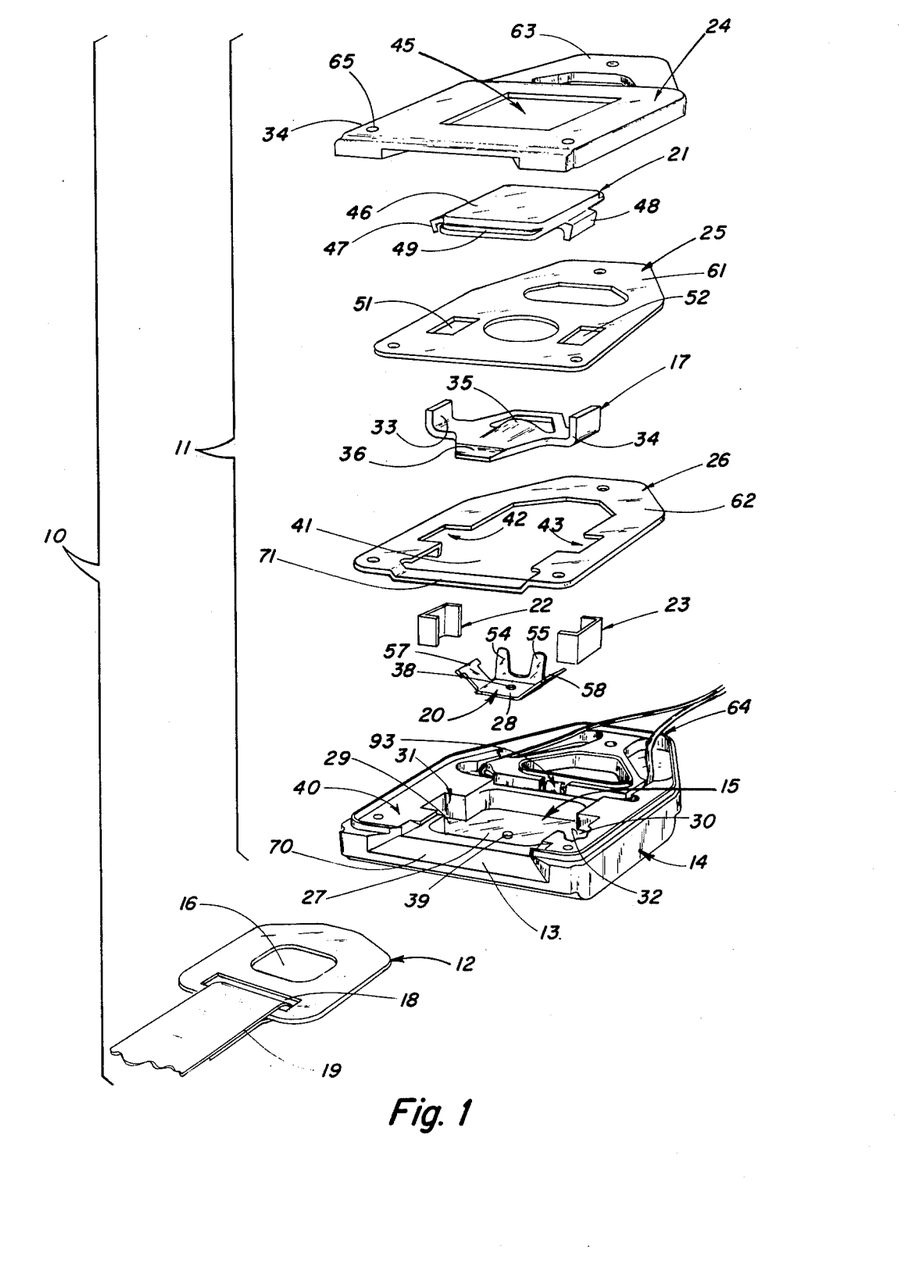
FIG. 1 is an exploded perspective view of a seat belt buckle with tongue incorporating the present invention.

Referring now more particularly to FIG. 1, there is shown a seat belt buckle and tongue combination 10 for installation in a vehicle to secure occupants therein. Combination 10 includes a seat belt buckle 11 and a tongue 12 insertable through inlet means 13 of main body 14 and into the cavity 15 of the main body. Tongue 12 is provided with an aperture 16 which is releasably engageable with a spring-biased latch plate 17 slidably mounted vertically within cavity 15. Tongue 12 includes a second aperture 18 through which one end of belt 19 extends being securely fastened to tongue 12.

A double leaf or coil spring 20 is positioned within cavity 15 beneath latch plate 17 so as to urge the latch plate upwardly to engage tongue 12. Spring 20 is yieldable when push button 21 is moved downwardly so as to force the latch plate 17 to disengage tongue 12. Latch plate 17 is slidably mounted in a pair of upright channels 22 and 23 positioned within cavity 15. Cover 24 is fixedly mounted to main body 14 and has a reinforcing plate 25 recessed therein whereas another reinforcing plate 26 is recessed in main body 14.

Main body 14 (FIG. 1) has an open top in which the leaf spring 20, channels 22 and 23, latch plate 17 and reinforcing plate 26 are inserted with the push button 21, plate 25 and cover 24 then being installed on main body 14. The bottom surface 27 of cavity 15 provides a support and location for the base 28 of spring 20 and is at the same level as the bottom surfaces 29 and 30 of channels 31 and 32 which are provided in the opposite sides of the cavity. C-shaped channels 22 and 23 are positioned in channels 31 and 32 of housing or main body 14 and stand upright atop surfaces 29 and 30.

Latch plate 17 is disposed in cavity 15 and has a pair of outwardly-extending arms 33 and 34 which are slidably received in channels 22 and 23. Arms 33 and 34 extend upwardly from the main body of latch plate 17. Projection 35 slopes upwardly from the tapered leading edge 36 of the latch plate to allow tongue 12 to slide into the cavity and over projection 35. The rear edge 37 (FIG. 2) of projection 35 drops sharply so as to prevent disengagement of the tongue from the latch bar until the latch plate is depressed.

Base 28 of leaf spring 20 is provided with hole 38 which receives round protrusion 39 projecting upwardly from surface 27 of cavity 15. Base 28 is positioned atop surface 27 and is secured thereby by projection 39. Upwardly-extending spring-biased arms 57 and 58 extend through the cavity and into channels 22 and 23 beneath latch plate 17 to abuttingly engage the bottom surface of the latch plate. Each arm 57 and 58 extends upwardly at approximately 45° from base 28 and outward into channels 22 and 23. Two small vertical arms 54 and 55 extend vertically from the rear of the spring base 28 to contact tongue 12 and assist in pushing out tongue 12 when latching plate 17 is released. Channels 22 and 23 must be sufficiently spaced apart so as to allow arms 57 and 58 of the leaf spring to be depressed thereby extending further outwardly into the channels 22 and 23. Once tongue 12 is inserted into cavity 15 and is engaged with projection 35 of latch 17, the tongue may not be withdrawn until button 21 is depressed. Lateral force is transferred onto latch plate 17 in the event tongue 12 is pulled in the direction opposite of the buckle without depressing button 21. The lateral force applied to latch plate 17 is transferred to channels 22 and 23, respectively, by arms 33 and 34.

Main body 14 is provided with a recess 40 which is positioned above surfaces 29 and 30. Reinforcing plate 26 is received in recess 40 and is provided with a central aperture 41 through which latch plate 17 moves. A pair of channels 42 and 43 are provided in plate 26 which open into aperture 41. Channels 22 and 23 are press-fitted into channels 42 and 43 thereby insuring that channels 22 and 23 remain upright within cavity 15.

Figure 5:
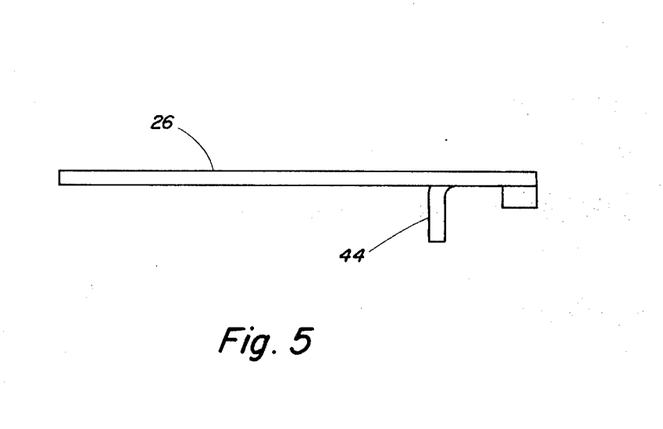
FIG. 5 is a side view of plate 26 shown in FIG. 1.

Plate 26 is provided with a downwardly-extending flange adjacent each channel 42 and 43 which abuts atop surfaces 29 and 30. For example, flange 44 (FIG. 5) extends downwardly from channel 42 (FIG. 1) and abuts atop surface 29 whereas another leg extends downwardly from channel 43 so as to abut surface 30 with both legs supporting plate 26 preventing relative motion between th plate and main body 14. Channels 22 and 23, respectively, fit within channels 42 and 43 and are positioned rearwardly of the flanges. For example, channel 22 is positioned rearwardly of flange 44.

Figure 4:
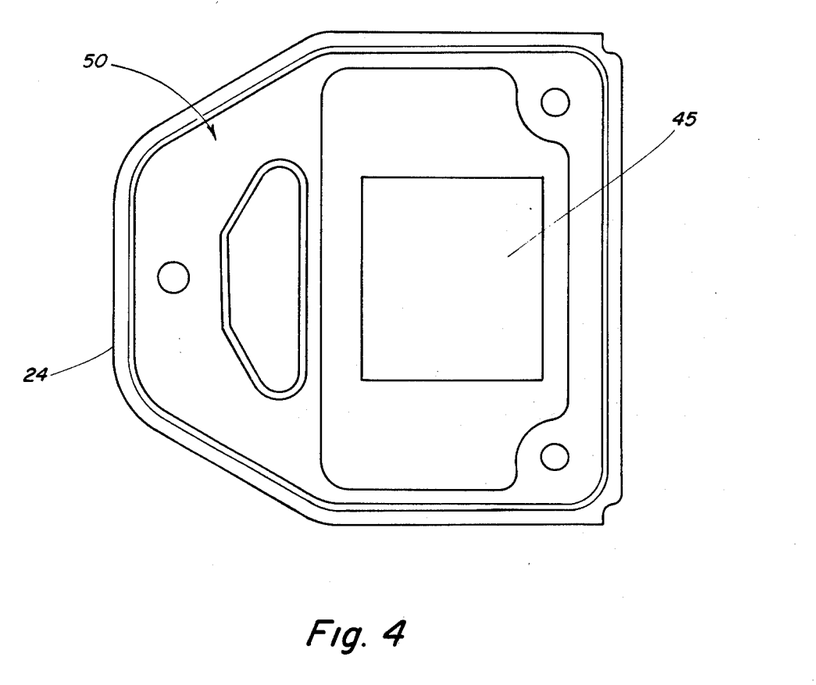
FIG. 4 is a bottom view of the buckle cover 24 shown in FIG. 1.

The top portion 46 of push button 21 projects through aperture 45 of cover 24 when the push button is in the upward position. Button 21 includes a pair of outwardly-extending legs 47 and 48 which extend slidably into channels 22 and 23 against and atop the arms 33 and 34 of latch plate 17. The push button is accessible via aperture 45 to allow the button to be pushed downwardly moving the latch plate and leaf spring downwardly so as to disengage the latch plate from tongue 12. A shoulder 29 extends around the upwardly projecting portion 46 of button 21 preventing the button from falling through aperture 45 of cover 24. The button is positioned between cover 24 and reinforcing plate 25 which is received within recess 50 (FIG. 4) of cover 24. Plate 25 is provided with a pair of rectangular holes 51 and 52 through which, respectively, channels 22 and 23 extend. Holes 51 and 52 are sized relative to channels 22 and 23 so as to tightly grip the channels thereby insuring that the channels remain upright. Recesses 40 and 50 of main body 14 and cover 24 are sized relative to plates 26 and 25 so that plate 26 contacts plate 25 across the entire bottom surface of plate 25 when cover 24 is tightly secured to main body 14. Conventional fastening means such as rivets 53 (FIG. 2) extend through and tightly secure together plates 25, 26 and cover 24 and main body 14. Thus, the lateral force exerted by tongue 12 through latch plate 17 and channels 22 and 23 is applied to plates 25 and 26 which are tightly secured to the main body and cover of the buckle thereby insuring that the lateral force applied to the entire laminated buckle without stress being applied to any of the plastic parts such as cover 24 or main body 14. Rivets 53 insure that the lateral force is applied evenly through the laminated buckle.

Figure 2:
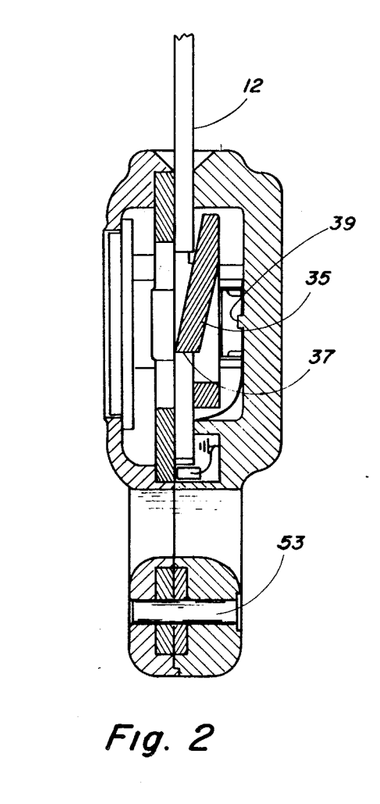
FIG. 2 is a cross-sectional view of the assembled buckle with tongue inserted therein.

Plates 25 and 26 are provided with, respectively, extensions 61 and 62 which are aligned with and positioned between extensions 63 and 64 of cover 24 and main body 14. A belt aperture is provided in each extension to facilitate extending a seat belt through the apertures in order to secure the seat belt to the buckle. Rivets 53 may be extended through a small hole provided in each extension so as to secure the plates, cover and main body together such as shown in FIG. 2. Likewise, additional rivets may be extended through the forward corners of plates 25 and 26 and main body 14 so as to secure the plates, cover and main body together.

Entrance means 13 of main body 14 is formed by recess 40 in main body 14 and the lower edge of cover 24. In addition, the leading edge 71 of plate 26 (FIG. 1) extends downwardly from the main body of plate 26 so as to be positioned inwardly of but aligned with recess 40 of main body 14. Thus, the leading edge 71 of plate 26 provides a guide or lip for the tongue being inserted into cavity 15 and onto latch plate 17. The leading edge 36 of latch plate 17 is positioned inwardly of and aligned with leading edge 71 of plate 26 when the latch plate is in the upward position.

Figure 3:
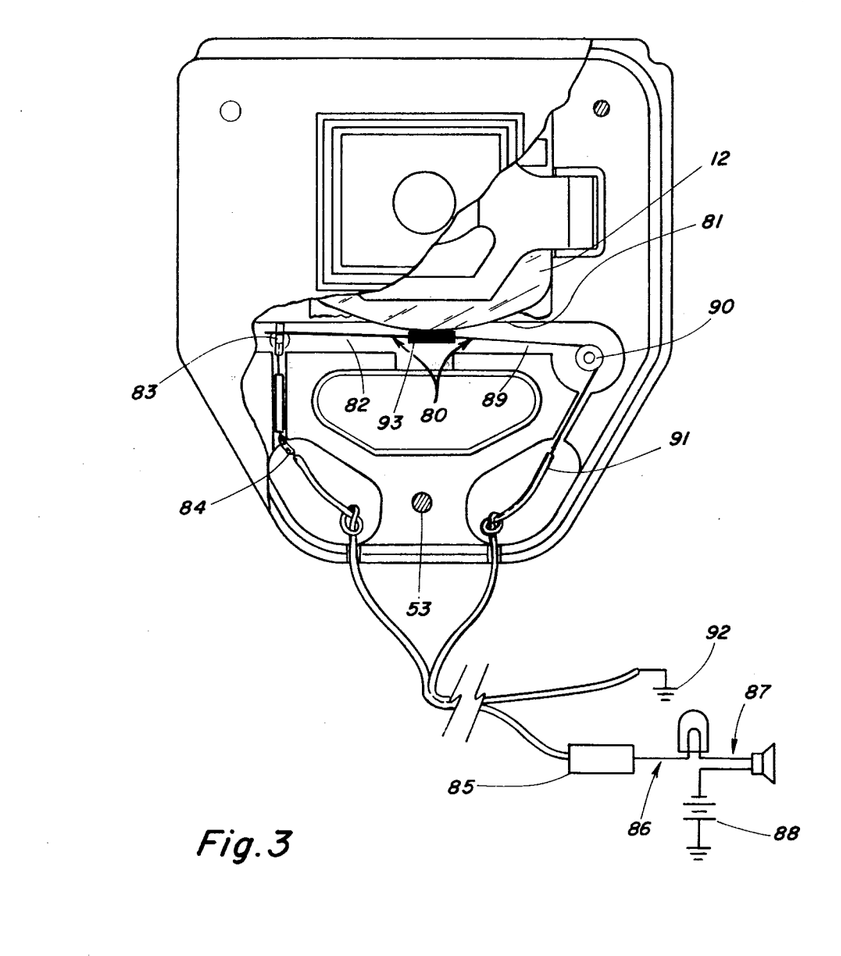
FIG. 3 is a fragmentary top view of the main body of the buckle.

An electrical switch may be mounted within the buckle so as to activate an external alarm whenever the buckle is not engaged with the tongue and when the vehicle ignition is activated. For example, electrical switch arm 80 is shown mounted to main body 14 (FIG. 3) by means 90, such as an insulated rivet, and is engaged by the leading edge 80 of tongue 12. Electrical switch arm 80 includes a silver plated spring contact portion 82 which hits contact 83 when tongue 12 is fully inserted thereby forcing arm 80 rearwardly. Contact 83 is connected to electrical wire 84 extending outwardly of the housing to a suitable ignition sensor 85 and external alarms 86 and 87. Contact 83 is insulated from the buckle housing. External alarms 86 and 87 are connected to a suitable source of electrical energy 88. Likewise, the spring contact arm 80 is connected by means 90 to main body 14 and in turn connected to wire 91 extending outwardly from the main body to a suitable ground 92. The insulated button 93 contacts portion 82 to isolate the switch from buckle tongue 12. Contact arm 82 extends freely in the cavity of body 14. The leading edge 81 of tongue 12 contacts button 93 resulting in the electrical contact between contact arm 82 and contact 83 thereby completing the circuit and deactivating the external alarm, depending upon the controls within ignition control 85. The seat belt buckle disclosed herein may be provided with or without the electrical switch.

Many variations are contemplated and included in the buckle disclosed herein. In one embodiment, the cover and main body are produced from plastic whereas the reinforcing plates 25 and 26 are produced from metal.

The dual-latch form of the buckle shown in FIGS. 6-11 utilizes certain modified components. This embodiment of the buckle assembly is intended for use with special configuration harnesses such as those utilized with infant car seats. The buckle, in these applications, may be attached to a crotch strap with shoulder straps attached to each of twin tongues. The resulting assembly is one which maintains the "load transfer to the reinforcing plates" feature of the initially described embodiment and permits the dual latch plates or tongues to be simultaneously released when the push button is depressed. The tongues are provided with a longitudinally truncated configuration and each has a suitably formed aperture receiving a latch plate catch. In FIGS. 6-11 those parts which are unchanged from their counterparts of FIGS. 1-5 are given reference numerals identical to those used in FIGS. 1-5.

Figure 6:
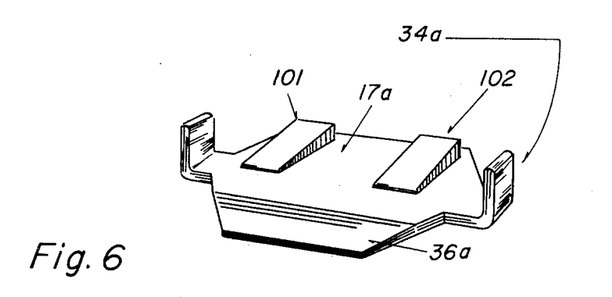
FIG. 6 is a perspective view of a modified form of the latch plate.
Figure 7:
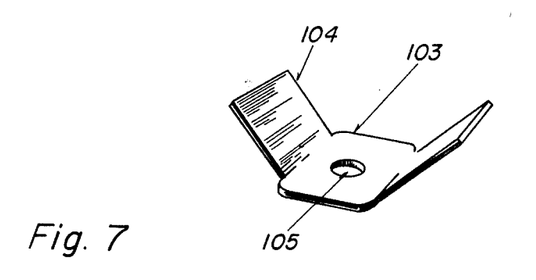
FIG. 7 is a perspective view of a modified form of the leaf spring.
Figure 8:
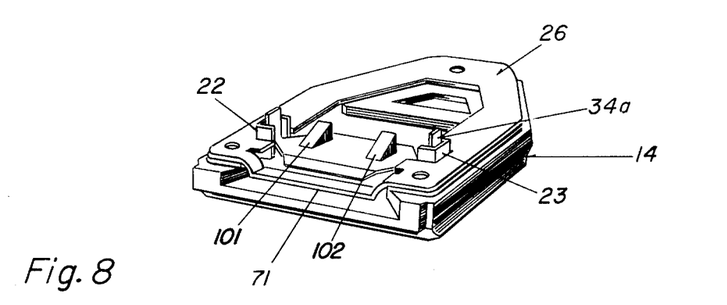
FIG. 8 is a perspective view of the buckle body with the latch plate of FIG. 6 in place.

Referring to FIGS. 6 and 8, the latch plate 17a is provided with arms 24a and two, transversely spaced abutments forming catches 101 and 102. The plate has a bevelled, leading edge surface 26a, comparable to the leading edge 36 of plate 17 of FIG. 1.

As may best be seen in FIG. 8, the dual-catch latch plate 17a is positioned in body 14 with its arms 34a extending through channels 22 and 23 which are seated in the reinforcing plate 26. Not visible in FIG. 8, but underlying the plate 17a is the leaf spring 103 (FIG. 7) which has resilient arms 104 and a locating aperture 106.

Figure 9:
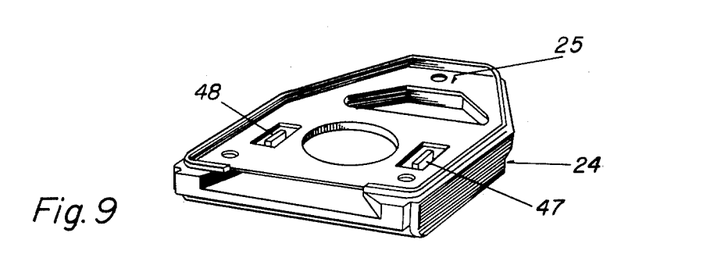
FIG. 9 is a perspective view of the cover component of the buckle with reinforcing plate and push button in place.
Figure 10:
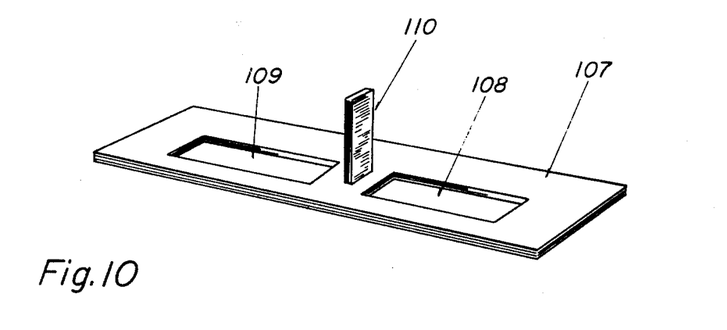
FIG. 10 is a perspective view of the closure plate used with the modified buckle assembly of FIGS. 6–9.

FIG. 9 shows the cover 24, with reinforcing plate 25 positioned therein and overlying the push button 21 whose legs 47 and 48 are visible in FIG. 9. It will be evident from FIGS. 1, 8 and 9 that when the buckle is assembled, the cover 24 is placed atop the body 14 with plates 25 and 26 facing each other. The mouth area, providing entry into the body cavity, is completed by a plate 107 (FIG. 10) which has two, edge-aligned openings 108 and 109. The plate 107 is secured by adhesive or any other suitable means across the end face of the buckle. An integral member 110 extends from the inner face of the plate 107 and, when the plate is in place, divides the entry area to the housing cavity. The openings 108 and 109 are aligned with the latch plate catches 61 and 62, respectively, and the memer 110 serves as a partition preventing a belt tongue entering one of the openings from being skewed so as to interfere with the adjacent opening or to be cocked with relation to its particular latch plate catch.

Figure 11:
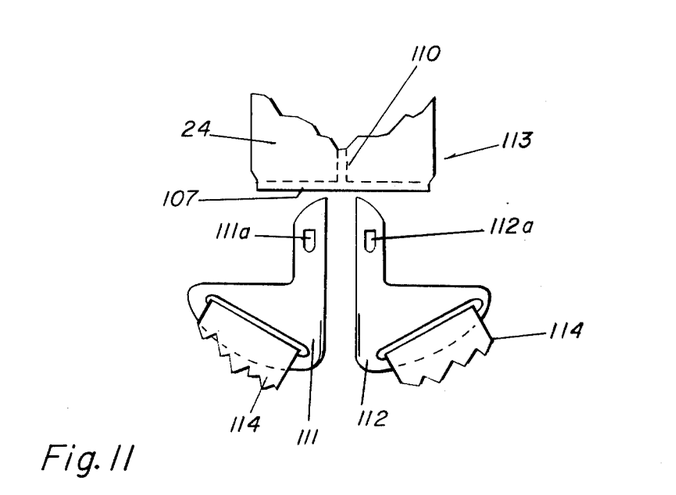
FIG. 11 is a fragmentary top plan view of the dual tongue-receiving embodiment of the buckle assembly of FIGS. 6–10.
Figure 12:
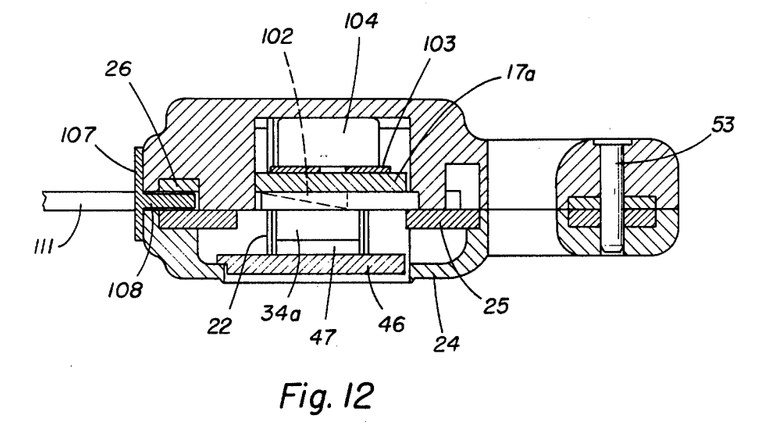
FIG. 12 is a side sectional view of the buckle shown in FIGS. 6–11.

The tongues for use with this modified form of the buckle are shown in FIG. 11 and identified at 111 and 112, the buckle as described with reference to FIGS. 6-10 being indicated generally at 113 in FIG. 11. The tongues are L-shaped and identical in configuration and accommodate straps 114 which extend at an angle to the direction of entry of the tongues into the buckle, the straps 114 serving as shoulder straps in a typical application. The buckle entry portions of the tongues have elongated openings 111a and 112a which have a straight forward margin adapted to engage the vertical face of the latch plate catches 102 and 101, respectively, when the tongues are inserted, individually, into the buckle 113. When the tongues are in place in the buckle their adjacent side margins are generally parallel.

The buckle of FIGS. 6-11 has the load transfer characteristics of the initially described embodiment but accommodates dual tongues. Depressing the push button 46 serves to move the latch plate and to simultaneously and abruptly release both tongues from the buckle.

The preferred embodiment of the buckle tongue combination is shown in FIGS. 13-16. This embodiment of the buckle assembly allows for the most complex configured component to be produced from plastic with the main body of the buckle produced from sheet metal. Such a structure allows for an alternate method of construction as compared to the embodiments heretofore disclosed while at the same time achieving the effective load transfer of the tongue force to the metal components without causing failure of a major plastic component. The buckle tongue combination 200 is shown in the exploded view of FIG. 13 and includes a buckle 201 which receives seat belt tongue 211.

Figure 13:
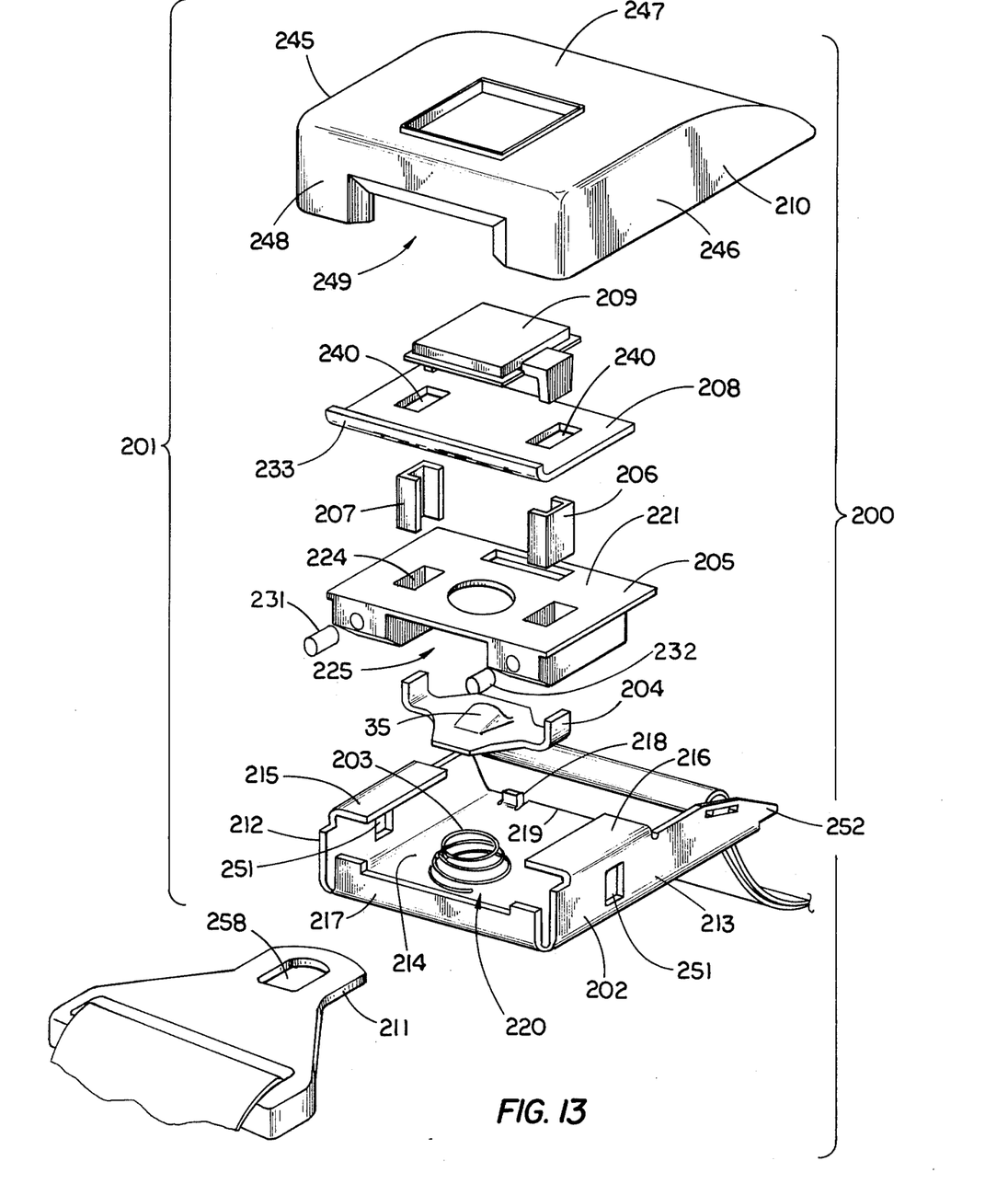
FIG. 13 is an exploded perspective view of the preferred embodiment of a seat belt buckle with tongue incorporating the present invention.

Buckle 201 has a sheet metal main body 202 housing a helical spring 203 and in turn urging latch plate 204 to engage tongue 211 positioned within the bottom cavity of a plastic block 205 located atop main body 202. A pair of channels 206 and 207 lock a metal plate 208 atop block 205 and provide a guide slidably receiving the downwardly extending legs of push button 209 which operates and engages the upward turn arms of latch plate 204. A plastic covering or top 210 extends outwardly of and is secured to main body 202.

Several of the components of buckle 201 are identical to components of buckle 11 shown in FIG. 1 and will thus not be further described. Push button 209, channels 206 and 207, and latch plate 204 are identical respectively to push button 21, channels 22 and 23, and latch plate 17 shown in FIG. 1. Metal helical spring 203 has a large coil resting atop the bottom wall of the main body 202 and a smaller top coil which is nestingly received in a cavity provided on the bottom surface of latch plate 204.

Main body 202 includes a pair of parallel side walls 212 and 213 integrally joined to a bottom wall 214. The top end portions of side walls 212 and 213 are turned inwardly providing a pair of flanges 215 and 216 parallel to the bottom wall 214. Likewise, the forward edge of bottom wall 214 is turned upwardly forming a lip 217 whereas upwardly extending stops 218 are formed on rear edge 219 of bottom wall 214. Plastic block 205 is inserted into the cavity 220 generally formed by the side walls, top flanges, lip and stops of main body 202. Block 205 may be inserted into cavity 220 through the rear opening of the cavity and pushed forward so as to abut against lip 217. Likewise, stops 218 extend upwardly against the back surface of block 205 thereby cooperatively with lip 217 limiting horizontal motion between block 205 and main body 202 as more specifically shown in the cross-sectional view of FIG. 15.

Figure 14:
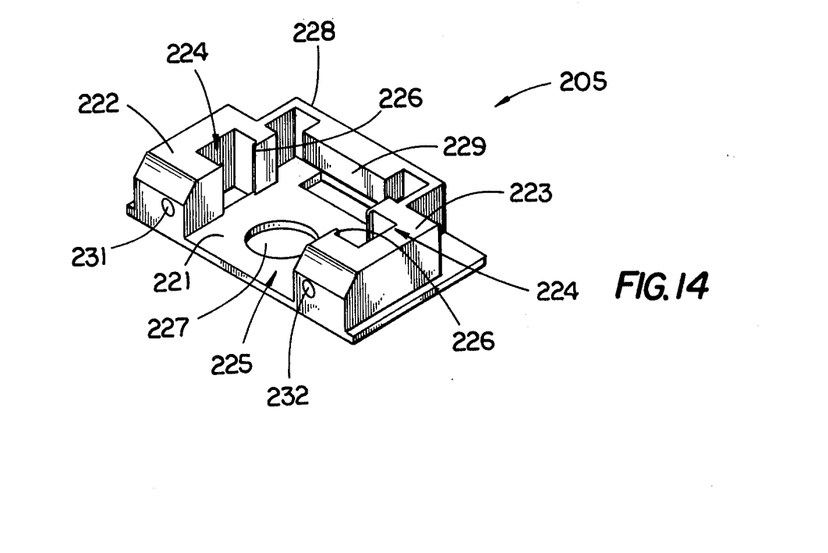
FIG. 14 is a bottom perspective view of one of the components, block 205, shown in FIG. 13.
Figure 15:
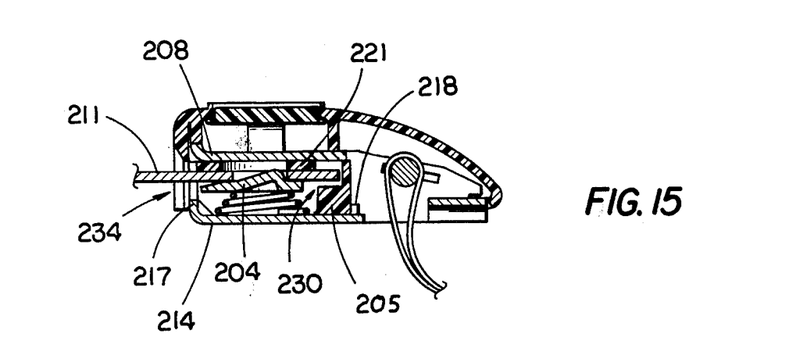
FIG. 15 is a cross-sectional side view of the assembled buckle with tongue inserted therein shown in FIG. 13.
Figure 16:
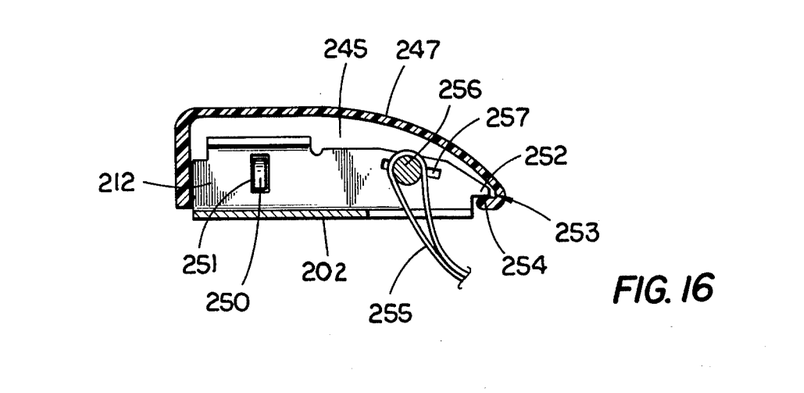
FIG. 16 is an additional cross-sectional side view showing the cover mounted to the seat buckle main body of FIG. 13.

A bottom perspective view of block 205 is shown in FIG. 14 and includes a top wall 221 integrally mounted atop a pair of runners 222 and 223 in contact with wall 214 (FIG. 13) of main body 202. Each runner 222 and 223 includes a channel passage 224 in which channels 206 and 207 are mounted. Runners 222 and 223 are spaced apart forming a tongue-receiving cavity 225. Channel passages 224 are mutually opposed and open into cavity 225. Passages 224 are slightly narrowed by ribs 226 of runners 222 and 223 with ribs 226 engaging the edges of channels 206 and 207 preventing the channels from moving from passages 224 into cavity 225. Passages 224 extend through wall 221 (FIG. 13) in order that the C-shaped upright channels 206 and 207 may fit into the passages. A circular hole 227 is provided in wall 221 for receiving the upraised projection 35 (FIG. 13) when the latching plate is in the most upward position and not engaged with tongue 211.

Block 205 includes a rear wall 228 integrally attached to runners 222 and 223. Likewise, wall 228 is contiguous to upper wall 221 with ledge 229 extending forwardly from back wall 228 into cavity 225. Ledge 229 lies in a plane parallel to wall 221 defining a tongue-receiving channel 230 (FIG. 15) to limit relative motion in the vertical direction between block 205 and seat belt tongue 211 when the tongue is inserted fully into the buckle and between ledge 229 and wall 221.

In the event force is applied to the buckle and tongue to remove the tongue from the buckle without first depressing the push button, the force will be directed onto latch plate 204 and then onto the upward extending channels 206 and 207 by the upwardly extending arms of latch plate 35 as previously described for the other embodiments. In the embodiment shown in FIGS. 14 and 15, each runner 222 and 223 is provided with a metal pin 231 and 232 which extends from forward of the most forward portion of block 205 toward and slightly into passages 224. Thus, force applied to channels 206 and 207 will in turn be directed through pins 231 which are in contact with lip 217 (FIG. 15) thereby transferring the force applied by the seat belt tongue on the latching plate and channels to the lip of the main body member. Block 205 is therefore a reinforcing means to increase the strength of the buckle.

Plate 208 is a second reinforcing means and is seated immediately atop and in contact with block 205. Plate 208 has a forward and upwardly turned edge portion 233 extending outwardly of block 205. Edge portion 233 is coplanar with lip 217 defining an entrance passage 234 (FIG. 15) to the cavity 225 of block 205 in which the latch plate and helical spring are located. A reinforcing rib surrounding the push button hole in buckle top 210 extends downwardly against the main body of plate 208 (FIG. 15) and the upwardly turned lip 233.

In order to assemble the buckle shown in FIG. 13, latch plate 204 is inserted into cavity 225 of block 205 with the upwardly extending arms of the latch plate being located in passages 224. Helical spring 203 is then placed adjacent the bottom side of latch plate 204 and the combination is then inserted through the rear opening of cavity 220 of main body 202 with block 205 being located between bottom wall 214 and flanges 215 and 216 and with the pins 231 and 232 in contact with lip 217 and the rear wall 228 of the block in contact with stops 218. Plate 208 may then be inserted through the front opening of cavity 220 until portion 233 is aligned with lip 217. Plate 208 is located between flanges 215, 216, and the top surface of block 205. Channels 206 and 207 are then inserted through apertures 240 of plate 208 with the apertures being in registry with passages 224. Thus, channels 206 and 207 extend through plate 208 and into block 205 preventing relative movement between plate 208 and block 205 while serving as a guide for the upward turn arms of latching plate 204. Push button 209 is then placed atop plate 208 with the downwardly extending legs of the push button extending into channels 206 and 207. It can be appreciated that channels 206 and 207 provide a locking means for locking together plate 208 and block 205. Finally, cover 210 is mounted to main body 202.

Cover 210 includes a pair of opposite side walls 245 and 246 integrally connected to a top wall 247 provided with an aperture through which push button 209 may project. In addition, the forward wall 248 is provided with an entrance passage 249 leading into cavity 225 of block 205. The edges of front wall 248 are bevelled adjacent passage 249 to facilitate the entrance of the tongue into the buckle. A pair of mutually opposed projections are formed on the inside surfaces of side walls 245 and 246 and project inwardly so as to engage the opposite side walls of the main body. For example, projection 250 is provided on the inside surface of wall 245 (FIG. 16) and projects into hole 251 provided on wall 212 of main body 202. A similar projection and aperture is provided on walls 246 and 213 of cover 210 and main body 202.

The rear edge portion of side walls 212 and 213 (FIG. 13) of main body 202 is cut away forming an extension 252 at the upper rear edge of each side wall. These two extensions are fittingly received into a recess 253 (FIG. 16) located between the top wall 247 of the cover and a pair of ledges 254 integrally attached to the opposite side walls 245 and 246 of the cover. When installing the plastic cover 210 onto main body 202, extensions 252 are first fitted into recesses 253 with the cover then being pivoted until projections 250 snap into holes 251 provided in the opposite side walls 212 and 213 of the main body. Holes 251 and projections 250 are located near the upward turn lip 217 of the main body thereby cooperatively with recess 253 securing the cover to the main body.

Web 255 extends around roller 256 (FIG. 16) having opposite ends slidably received in a pair of slots 257 provided in the opposite side walls 212 and 213 of main body 202. Likewise, a web is attached to tongue 211 which also includes a latch plate-receiving aperture 258. Many variations are contemplated and included in the preferred embodiment. For example, block 205 and cover member 210 are produced from a polymeric material whereas plate 208 and main body 202 are formed of metal. Other materials may be used for a variety of components within the buckle. It will be appreciated that the forward wall 248 of cover 210 along with lip 217 of main body 202 form an entry passage for the seat belt tongue into a cavity located between block 205 and main body 202.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. The combination of:
    a tongue plate with a latch aperture;
    a buckle into which said tongue plate is inserted and including a main body with a forward lip and a rear stop, a block positioned on said main body between said stop and lip which limit movement thereof with said block defining with said main body a tongue plate-receiving cavity, latching means located in said cavity and projecting into said aperture being operable to releasably hold said tongue plate in said cavity, a plate member positioned between said main body and said block with said main body extending on opposite sides of said plate member and block limiting movement between said plate member, block and said main body; and
    locking means extending through said plate member into said block locking said plate member and block together.

2. The combination of claim 1 wherein:
    said block includes an upper wall and a back wall with a ledge extending forward from said back wall into said cavity and parallel to but spaced apart from said upper wall defining an channel in which said tongue plate is located limiting relative motion between said tongue plate and block.

3. The combination of claim 1 wherein said locking means includes a pair of locking members, said block includes a pair of load transfer members extending from said locking members to said lip transferring load applied by said tongue on said latching means and locking means to said main body.

* * * * *